United States Patent

Jacobs et al.

[15] 3,647,202

[45] Mar. 7, 1972

[54] PLY SHIFTER ASSEMBLY

[72] Inventors: Herbert V. Jacobs, Greenhill Apts., Apt. WA602, 1001 City Ave., Lower Merion, Pa. 11235; Eric Winston, Melrose Park, Pa.

[73] Assignee: Herbert V. Jacobs

[22] Filed: Feb. 11, 1970

[21] Appl. No.: 10,535

[52] U.S. Cl. ............................................. 271/19, 271/26
[51] Int. Cl. ............................................. B65h 3/52
[58] Field of Search ........................... 271/19, 20, 36, 26, 21

[56] References Cited

UNITED STATES PATENTS

| | | | |
|---|---|---|---|
| 2,289,502 | 7/1942 | Kauffeld | 271/20 X |
| 2,395,644 | 2/1946 | Rowlands | 271/19 UX |
| 2,204,715 | 6/1940 | Wimmer | 271/36 |
| 2,869,867 | 1/1959 | Backhouse | 271/26 |
| 3,168,307 | 2/1965 | Walton et al. | 271/26 |

Primary Examiner—Joseph Wegbreit
Attorney—Caesar, Rivise, Bernstein & Cohen

[57] ABSTRACT

A ply shifter assembly comprising a rearwardly located ply shifter station, a centrally located air separation station and a forwardly located flutter tube station, all for the purpose of facilitating the separation of a topmost or otherwise exposed ply of goods from the remaining workpieces that have been assembled into a stack so that forward delivery of the workpiece is not impeded by the normal adherence inherent in many materials that are superimposed into a stack. The ply shifter station includes an actuator to drive a workpiece-contacting roller, as well as a clamp to hold down the remaining plies in the stack during the delivery of a workpiece. The air separation station involves means to discharge jets of air that will create currents to attract the topmost or exposed workpiece and cause it to become separated from the next workpiece in the stack. The flutter tube station is comprised of a fan-shaped discharge port that directs a stream of air forwardly and downwardly to loosen the leading edge of the workpiece.

5 Claims, 11 Drawing Figures

INVENTORS.
HERBERT V. JACOBS
ERIC WINSTON
BY
Caesar, Rivise,
Bernstein & Cohen
ATTORNEYS.

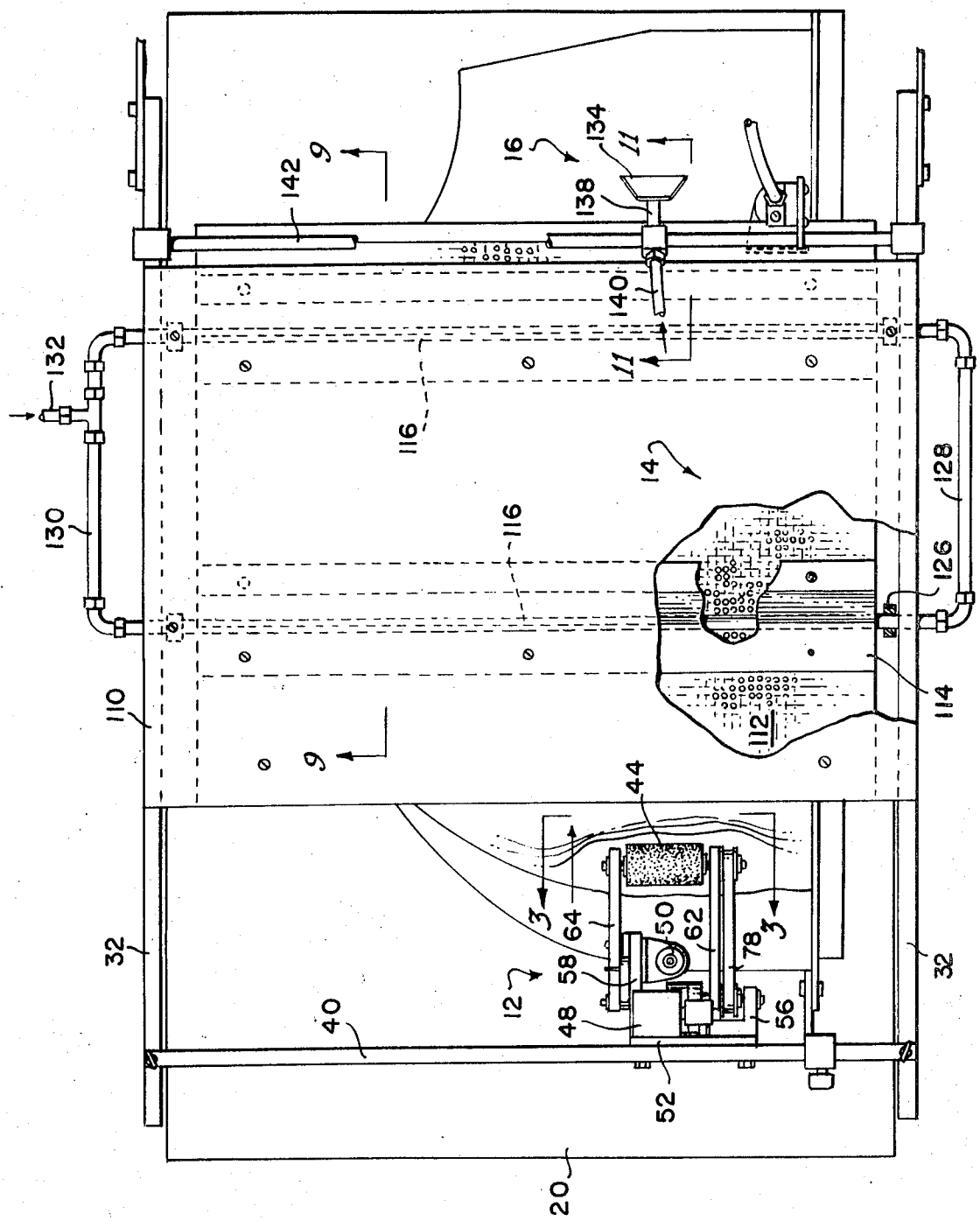

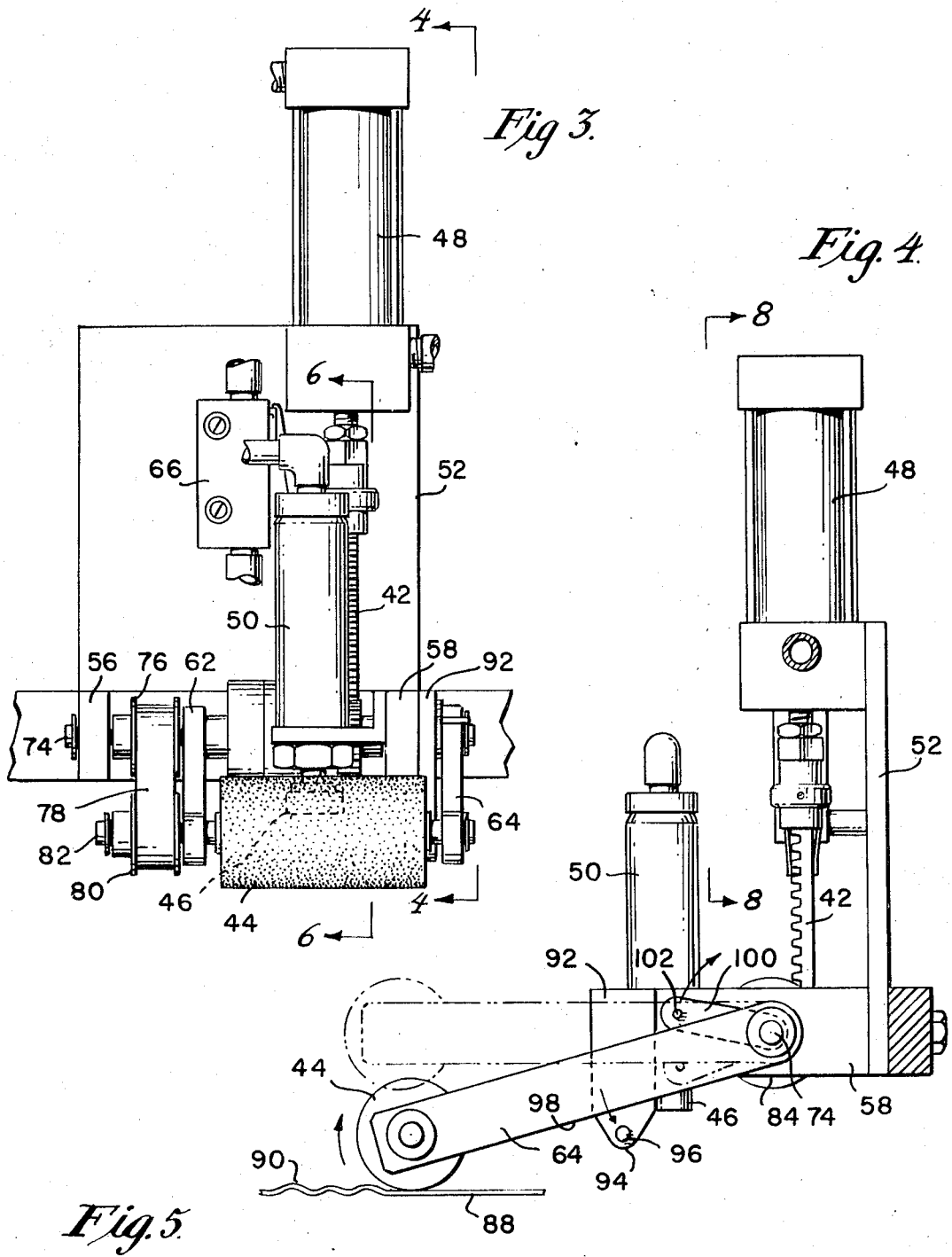

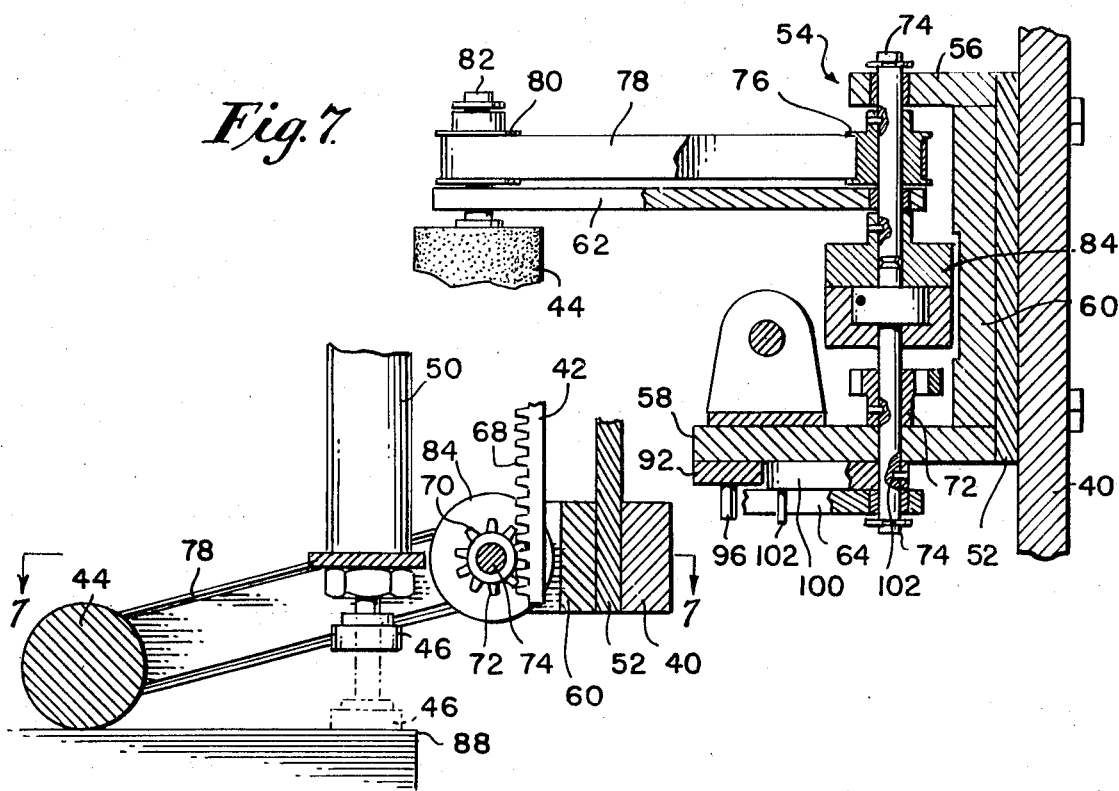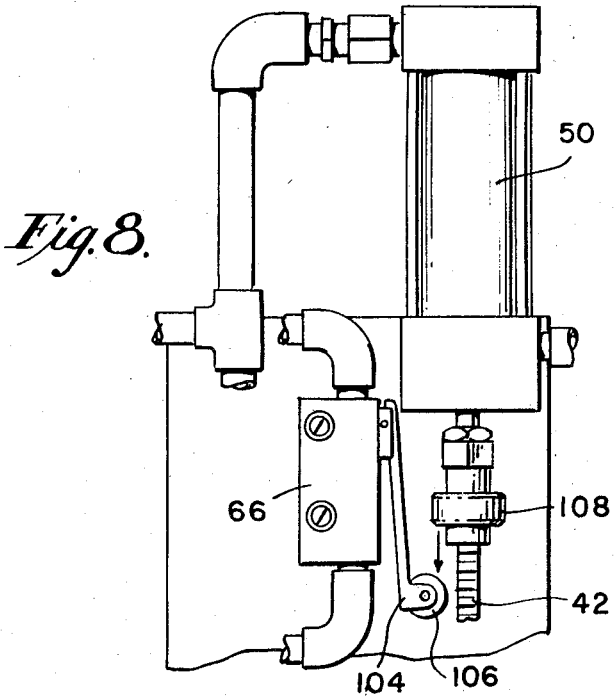

INVENTORS.
HERBERT V. JACOBS
ERIC WINSTON
BY
*Caesar, Rivise,
Bernstein & Cohen*
ATTORNEYS.

PLY SHIFTER ASSEMBLY

This invention relates to a ply shifter assembly, and has as its objective the provision of a new device in the field of cloth transport.

Prior Jacobs' patents, such as U.S. Pat. Nos. 3,223,059 and 3,386,396 have been a distinct contribution to the art in teaching various aspects of automation in the garment industry. These patents have covered many aspects of handling and movement of cloth, and further reference is made to Baron et al. U.S. Pat. No. 3,463,482 that is specific to the movement of cloth involving air jets as a guidance force.

Such cloth transport techniques were in addition to the Jacobs feeder or feeder foot means that employ a tacky adhesive surface. In the Jacobs feeder foot means the tacky adhesive surface would be brought into contact with an exposed ply, so that the exposed ply would be peeled away from the remaining plies or workpieces of cloth in the stack. In many applications, vacuum was also relied upon to assist the separation step, and the presence of a pin to create a forward dragging force has also been suggested for use with certain materials.

It is known that many materials have certain inherent properties so that plies of such materials adhere very readily to each other in a phenomenon that is sometimes termed as "-fiber entanglement." Certain of the Jacobs techniques specified hereinabove have been rather successful in combatting fiber entanglement, but still an alternate solution to the problem has been considered a commercial necessity, and thus upon further research the present invention was made.

It was recognized that the trailing edge of the goods presents perhaps the most difficult area since it is most remote from the feeder foot assembly. However, where the goods are particularly long, it was further recognized that some type of separation must be caused to take place in the central portion of the goods. With certain materials even the forward edge is of concern.

It is therefore an object of the present invention to provide a ply shifter assembly which is capable of overcoming fiber entanglement, particularly where lengthy or wide fabrics formed into a stack are involved.

Yet another object of the present invention is to provide a ply shifter which is reliable in operation, particularly in view of the demands of automated machinery, and the desire to reduce operating personnel to a minimum.

Still another object of the present invention is to introduce new fabric separation and air movement techniques into the garment industry.

The foregoing as well as other objects of the invention are achieved by providing a ply shifter assembly which includes an upwardly positioned ply shifter station, a centrally located air separation station and a forwardly located flutter tube station as will be described hereinafter.

Other objects and many of the attendant advantages of this invention will be readily appreciated as the same becomes better understood by reference to the following detailed description when considered in connection with the accompanying drawings wherein:

FIG. 2 is a sectional view taken along the lines 2—2 with certain portions removed for the sake of clarity;

FIG. 3 is an enlarged sectional view taken along the lines 3—3 of FIG. 2;

FIG. 4 is a sectional view taken along the lines 4—4 of FIG. 3;

FIG. 5 is a view that shows the lower portion of FIG. 4 in a different position wherein the roller and its assembly have been pivoted up and away from contact from a ply of goods;

FIG. 6 is a sectional view taken along the lines 6—6 of FIG. 4;

FIG. 7 is a sectional view taken along the lines 7—7 of FIG. 6;

FIG. 8 is a sectional view taken along the lines 8—8 of FIG. 4;

Figure 1:
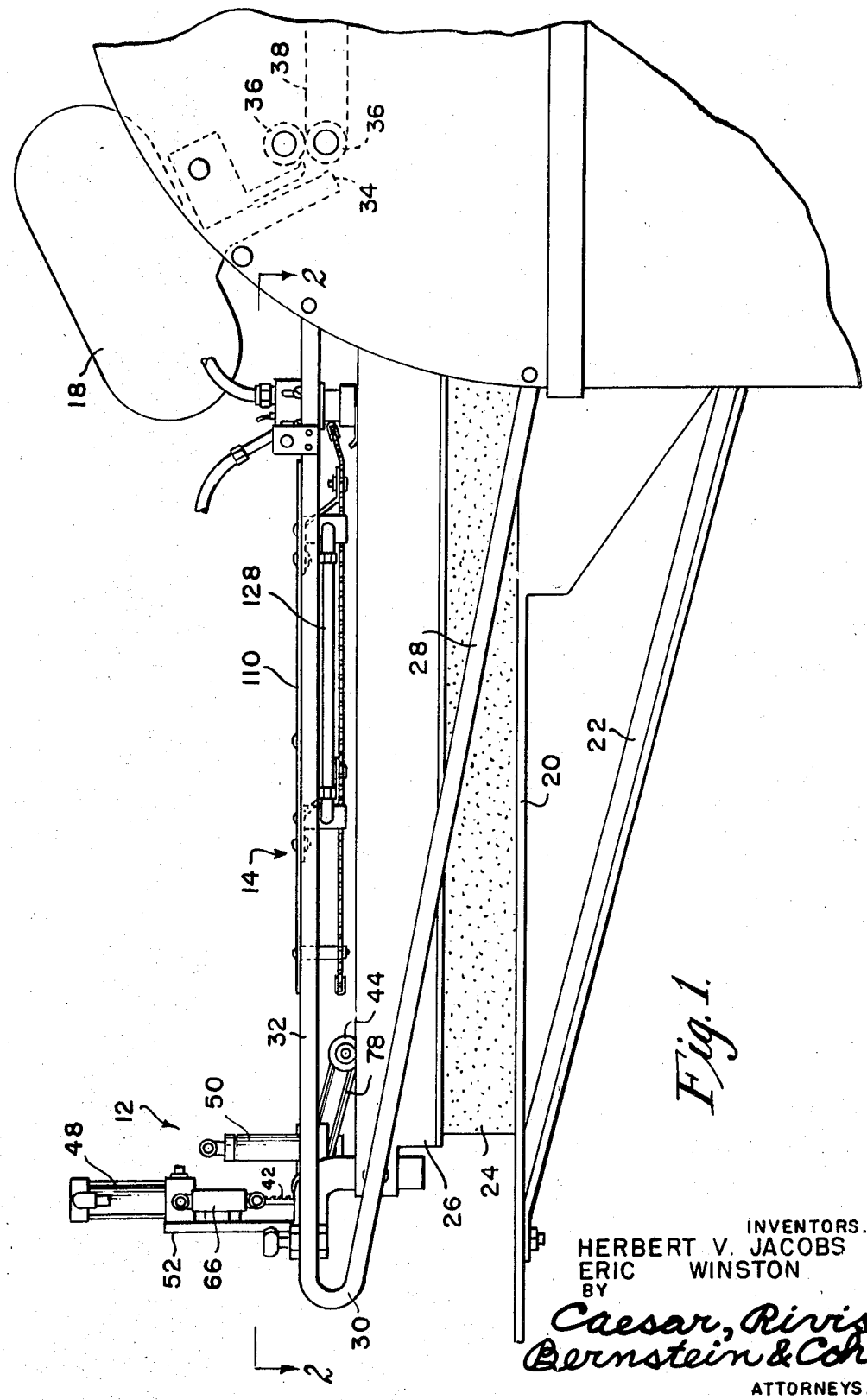
FIG. 1 is the side elevational view showing the ply shifter assembly of the present invention.

Referring in greater detail to the various figures of the drawings wherein like reference characters refer to like parts, there is shown generally at 10 a ply shifter assembly constituting an embodiment of the present invention. The ply shifter assembly basically comprises a ply shifter station 12, an air separation station 14 and a flutter tube station 16 (FIG. 2).

Figure 10:
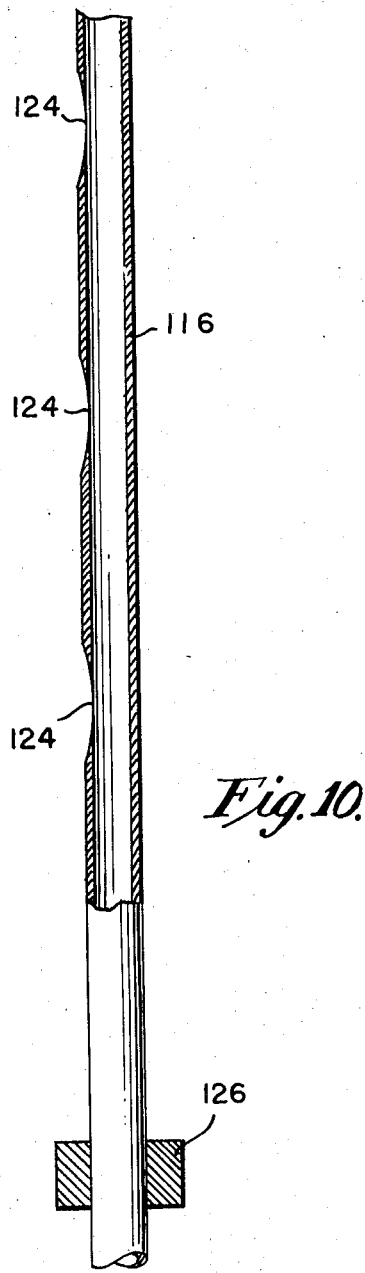
FIG. 10 is an enlarged sectional view taken along the lines 10—10 of FIG. 9.
Figure 11:
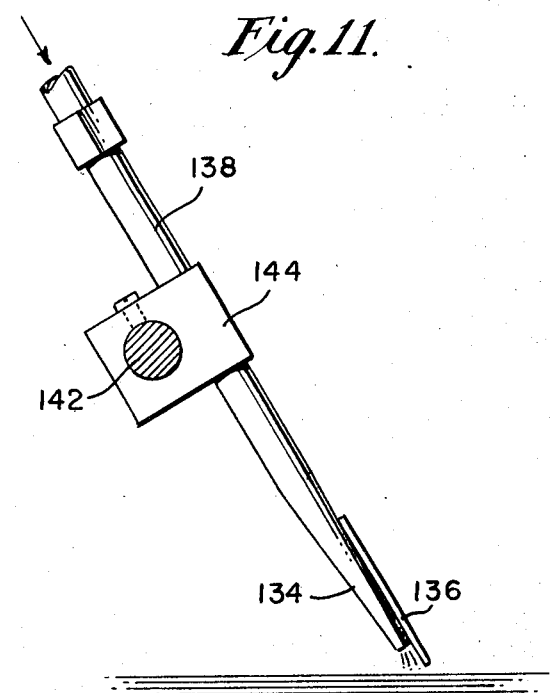
FIG. 11 is an enlarged sectional view taken along the lines 11—11 of FIG. 2.

As will be described hereinafter, the details of the ply shifter station can be best seen in FIGS. 3 to 8; the details of the air separation station appear in FIGS. 9 and 10, and details of the flutter tube station are shown in FIG. 11.

As can be seen in FIGS. 2 and 4 the ply shifter station acts upon the rearward or upstream edge of the topmost ply of goods in order to loosen or eliminate any attachment or fiber entanglement existing between the topmost ply of goods and the next ply of goods. As can be seen in FIG. 9 the air separation station 14 serves to have a similar loosening or release effect upon the middle section of the goods by creating a vacuum or airflow that draws up the middle section of the goods. As will be described hereinafter the flutter tube station serves to cast a fan-shaped jet of air forwardly and downwardly about the forward edge of the goods in order to have a similar loosening and release effect.

Before discussing any further details of any of the stations of the invention, certain structural features will be pointed out with reference primarily to FIGS. 1 and 2. It will be seen that FIGS. 1 and 2 generally show the feeder station of an automatic sewing assembly including pickup unit 18, all of which is generally shown in Jacobs U.S. Pat. No. 3,223,059 and Jacobs et al. U.S. Pat. No. 3,386,396. However, certain structural details of the feeder station will assist in a greater appreciation of the present invention.

As shown in FIG. 1 there is a lower platform 20 that is supported by brace 22 that extends to the main frame of the machine. A pad of foam 24 is situated upon the platform 20, and an edging guide 26 is provided so that the plies of goods or workpieces will be properly oriented as they are delivered by pickup unit 18, with the plies being provided in a stack that rests upon foam pad 24.

As further seen in FIG. 1 an inclined brace 28 is provided which extends rearwardly and upwardly until bend 30, with there being a straight run 32. The pickup unit 18 includes a feeder foot 34, the construction of which is shown in Jacobs et al. U.S. Pat. No. 3,386,396.

The feeder foot 34 is basically comprised of tacky adhesive means that function in conjunction with vacuum means, and in many cases pin means. The feeder foot drops down so that the tacky adhesive means make actual physical contact with a ply of goods. The feeder foot means then move away or lift, and after a predetermined time the vacuum means become operative so that the leading edge of the ply of goods is more securely held. The feeder foot continues to move, and then kicks forwardly in order to deliver the ply of goods between rollers 36 so that the ply of goods may be conveyed in a downstream direction by conveyor belt 38.

It is to be noted that the present invention has been found to be particularly successful in the delivery of large and long workpieces, particularly where such workpieces tend to cling together as when they are stacked in large numbers, one upon the other. While the present invention will be described in terms of acting upon the topmost ply of goods, nevertheless, the present invention contemplates application to a bottom feeder, and possibly other types of orientation.

With reference to FIG. 2, it will be seen that a back bar 40 extends between members 32 for support purposes as will be described hereinafter.

With reference to FIGS. 3 and 4, it will be seen that the ply shifter station 12 basically comprises actuator means 42 which serve to drive and otherwise move roller 44. The ply shifter assembly 12 further includes stack clamp means 46 which will serve to hold in place the remaining plies in the stack during delivery of the topmost or exposed ply by the feeder foot 34.

It will be seen that the actuator 42 is motivated by air cylinder 48, and the clamp means 46 are motivated by air cylinder 50. It is to be understood that the air cylinders may be replaced by other motive means or forms of actuation.

As will be discussed hereinafter a plate 52 is provided for support purposes, as well as an upper bar and a lower bar. The upper bar 54 (FIG. 7) includes side sections 56 and 58 that extend from the central section 60. It will also be seen from FIG. 7 that side section 58 is longer than side section 56. The lower bar revolvably supports roller 44 in its long side section 62 and a short side section 64. The sections 62 and 64 are arms which support the roller.

The air cylinders 48 and 50 are of conventional construction, and include inlet and outlet ports as shown in the drawing. Associated with the air cylinder 50 that actuates clamp 46 is a microswitch 66 (FIG. 3) which serves to actuate the air cylinder 50 and clamp means 46 at a predetermined time.

With reference to FIG. 6 it will be seen that the actuator 42 includes teeth 68 that are adapted to mesh with teeth 70 of gear 72 which is keyed to a long shaft 74 (FIG. 7). In this way downward motion of the actuator 42 causes a rotation of the shaft 74. This in turn causes rotation of a spool 76 that is also keyed to the shaft 74 as indicated in FIG. 7. A drivebelt 78 extends about the spool 76, with the drivebelt 78 also drivingly engaging spool 80. As indicated in FIG. 7 the spool 80 is attached to a roller shaft 82 that passes through an opening in the roller support 62, and then serves to drive the workpiece-engaging roller 44.

It will be seen from FIG. 7 that the long shaft 74 is revolvably supported in appropriate bearings in roller supports 62 and 64, and also in the side section 56. The roller shaft 82 is supported in side sections 62 and 64 as indicated in FIG. 3. A unidirectional clutch device 84 is provided so that when the actuator 42 is moving on its return stroke, the roller 44 will not be actuated. However, the clutch device 84 will again permit the roller 44 to be operated on its initial stroke in the next cycle.

It will be seen that after the roller 44 has rotated to cause a loosening or bunching 90 (FIG. 4) that is is necessary that the roller be pivoted up and away from contact with the work 88 to allow delivery of the workpiece in a downstream sense. As previously noted the roller 44 is pivotally supported from the sections 62 and 64. The mechanism for raising the roller 44 up and away from the work 88 is shown in FIGS. 4 and 5. This raising means includes a fixed plate 92 having a pointed lower edge 94 from which extends a pin 96 that is adapted to support lower edge 98 of the arm 64 and thereby prevent the arm 64 from going through any further downward pivoting movement.

The raising of the section 64 is accomplished by means of a pivotable plate 100 that is keyed at 102 to the shaft 74 (FIG. 7). The pivotable plate 100 includes a pin 102 (see FIGS. 4 and 5). It will be seen that the rotation of the shaft 74 which in turn causes rotation of the roller 44, also causes rotation of the pivotable plate 102 from the withdrawn position of FIG. 4, in a clockwise direction to the actuating position of FIG. 5 wherein the pin 102 engages the lower edge of the section 64. With continued clockwise rotation of the shaft 74, the pin 102 urges the section 64 upwardly to the dashed line position of FIG. 4, with the actual engagement of the pin 102 against lower edge 98 being shown in FIG. 5. Upon reversal of shaft 74, the plate 102 is returned to its original position.

It will be seen from FIG. 8 that the microswitch 66 is actuated by a lever 104 that includes a bumper 106 that will be engaged by a boss 108 which moves with actuator 42. This is in accordance with the desired sequence of operation of the ply shifter station.

When the actuator 42 starts its initial downward stroke, rotation of roller 44 is also initiated to achieve a bunching or shifting 90 of the topmost workpiece 88 (FIG. 4). This action is coordinated with the movement of feeder foot 34 which has already descended upon the leading edge of the workpiece 88. The feeder foot 34 has now lifted the leading edge of the workpiece 88, but the feeder foot 34 has not as yet begun to kick forwardly in order to deliver the leading edge of the workpiece 88 between the rollers 36. At this time the actuator 42 has almost completed its downward stroke, and the pin 102 engages the lower edge 98 of the arm 64. With further downward movement of the actuator 42, the roller 44 is pivoted up and away from contact with the trailing edge of the workpiece 38. Because of the action of the roller 44, and the forward delivery action of feeder foot 34, the trailing edge of the workpiece 88 has now been moved somewhat forwardly. Thus, when the microswitch 66 is actuated by the downward stroke of the actuator 42 upon lever 104, the clamp 46 will be urged upon the trailing edge of the workpiece immediately below workpiece 88.

In this way the remaining pieces of goods in the stack are tightly held by clamp 46 during the forward delivery of the workpiece 88. Since the roller 44 has now been pivoted up and away from the workpiece 88, there is no obstruction to the forward feeding of the workpiece 88 by the feeder foot 34 which is now completing its forward delivery of the leading edge of the workpiece 88 into the rollers 36 for further alignment and transport to the sewing head. The feeder foot 34 returns to its starting position, actuator 42 is raised, and thus the clamp 46 is raised. Also the roller 44 again contacts the exposed workpiece in the stack.

In order to assist the forward delivery of the workpiece 88, the air separation station 14 (FIGS. 2 and 9) and the flutter tube station 16 (FIGS. 2 and 11) are quite useful. The details of the air separation station 14 are best seen in FIGS. 9 and 10 with some reference to FIGS. 1 and 2.

Figure 9:
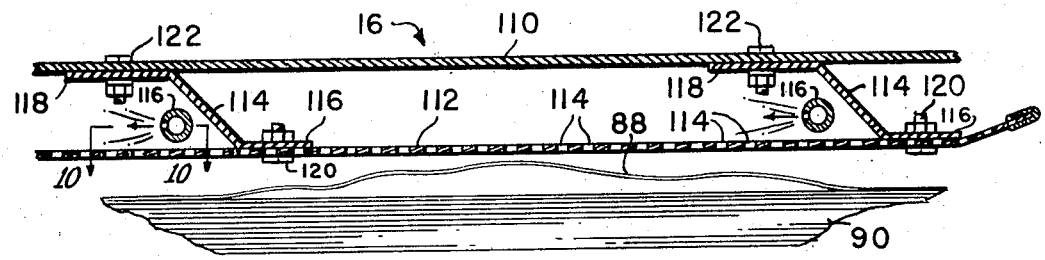
FIG. 9 is an enlarged sectional view taken along the lines 9—9 of FIG. 2.

It can be seen from FIGS. 2 and 9 that a support plate 110 spans opposing braces 32, and is secured thereto by appropriate fastening means. With further reference to FIG. 9, it will be seen that a screen 112 with openings 114 is provided below the top plate 110, with the screen 112 lying in a plane generally parallel to the top plate 110. The screen 112 is held in position by means of Z-shaped shields 114 which not only have a support function, but also a masking function for air tubes 116 as will be discussed hereinafter.

It will be seen from FIG. 9 that the shields 114 include lower portions 116 and upper portions 118. The lower portions 116 are secured to the screen 112 by means of bolts 120, with the upper portions 118 being secured to the underside of the plate 110 by means of bolts 122.

It will also be observed in FIG. 9 that the air tubes 116 possess a series of backwardly opening discharge ports 124 that are quite apparent from an inspection of FIG. 10. The air tubes 116 are secured to the top braces 32 by means of attachment sleeves 126. As seen in FIG. 2 both of the air tubes 116 are part of a closed delivery system which includes connecting run 128, and supply run 130 which is linked in with supply tube 132. The operation of the air separation station will be set forth in detail following a brief discussion of the flutter tube station as can best be seen in FIGS. 2 and 11.

The flutter tube station 16 is essentially comprised of a fan-shaped discharge port 134 with guard 136 as best can be seen in FIG. 11. Air is fed to the fan-shaped jet 134 through supply tube 138 that is connected to supply hose 140. It will also be seen that the flutter tube is secured to support rod 142 by means of connecting block 144. The operation of the entire ply shifter assembly, with particular emphasis upon the air separation station and flutter tube station will now be described, but it should be kept in mind that while the invention has been disclosed in terms of using but one ply-shifting device and but one flutter tube, that there may be situations that arise that call for the use of more than one of either or both the ply shifter and the flutter tube. Conversely, the ply shifter may have use by itself, and this principle applies to the air separation station and to the flutter tube.

It will be seen that all stations of the present invention are coordinated in their action with the movement of the feeder foot 34. The feeder foot acts upon the leading edge of the workpiece. The action of the feeder foot will be described as if the feeder foot was acting upon a topmost workpiece, although the feeder foot could be modified to operate upon a bottommost workpiece or upon other arrangements of workpieces in a stack.

The feeder foot first drops down so that its tacky adhesive means makes actual physical contact with the surface of a piece of goods. The feeder foot means then lift, and during this lifting step the vacuum means become operative so that the leading edge of the workpiece is securely held. Where pin means are associated with the feeder foot, such pin means will already be in engagement with the workpiece. Upon completion of the lifting step, the feeder foot will kick forwardly to delivery the piece of goods to the rollers 36.

It will be seen that the ply shifter station becomes operative as the feeder foot 34 has commenced its lifting step. At this time the actuator 42 starts its initial downward stroke, and thus rotation of the cloth-engaging roller 44 causes the requisite bunching or shifting 90 of the workpiece 88.

The feeder foot 34 has now almost completed its lifting step, and the actuator 44 has almost completed its downward stroke. At this time the pin 102 engages the lower edge 98 of the arm 64. With additional downward movement of the actuator 42, the roller 44 is pivoted up and away from contact with the trailing edge of the workpiece 38.

The feeder foot 34 has now begun to kick forwardly, thus moving the entire workpiece, including the trailing edge, forwardly. The actuator 42 now completes its downward stroke which includes actuation of lever 104 which in turn causes microswitch 66 to close and thereby urge clamp 46 downwardly into engaging position.

Since the topmost workpiece has now been delivered by the forward action of the feeder foot 34, the clamp means 46 will contact the next workpiece, and thereby hold the remainder of the stack in place. Also, it is to be noted that the roller 44 has been pivoted away from the topmost workpiece and so the forward delivery of feeder foot 34 is not impeded by the roller 44 which otherwise would be in contact with the topmost workpiece.

Prior to the time that the feeder foot 34 kicks forwardly, the air separation station 14 and the flutter tube station 16 are operative by appropriate timing means that can be actuated by the rising action of the feeder foot means, and then deactivated by the forward motion of the feeder foot means 34.

Thus, the air separation station sets up a backward blast or airstream that causes the central portion of the workpiece to be lifted away from the remainder of the stack, or at least initiates the loosening action. To the same effect is the flutter tube station 16 which may either be continuously operated or operated sequentially in the manner of the air separation station.

While the feeder foot 34 is returning to its initial position of descending upon the next workpiece, the ply shifter station has also brought to its initial condition with the raising of the actuator 42, a lowering of the roller 44 to cloth-engaging condition and a raising of the clamp means 46.

Without further elaboration, the foregoing will so fully illustrate our invention, that others may, by applying current or future knowledge, readily adapt the same for use under various conditions of service.

What is claimed as the invention is:

1. A ply shifter for use in conjunction with a piece of cloth in a stack, said ply shifter comprising a roller normally contacting said piece of cloth to move it away from other pieces of cloth in said stack, said roller being rotatably supported by at least one arm, actuator means to drive said roller, lift means engaging said arm to raise said roller at a predetermined time after said roller has operated, clamp means becoming operative in conjunction with the action of said lift means, said clamp means becoming operative after said roller has been raised, said clamp means when operative, contacting said stack after said piece of cloth has been moved away from the area where said clamp means engages said stack, means to deactivate said lift means after said piece of cloth has been moved to a predetermined position whereby said roller contacts the next piece of cloth in said stack.

2. The invention of claim 1 wherein said actuator is adapted to be moved up and down, and has teeth to engage and drive a meshing gear.

3. The invention of claim 2 including a belt driven by said gear, said belt in turn rotating said roller.

4. A ply shifter assembly comprising a ply shifter station, an air separation station located downstream of said ply shifter station and a flutter tube station located downstream of said air separation station, a feeder foot assembly adapted to deliver the downstream edge of a piece of cloth in a downstream direction, said stations acting upon said cloth to promote said delivery, said piece of cloth being a part of a stack of said pieces of cloth, said ply shifter station including a roller which engages said piece of cloth and moves it relative to the stack, said air separation station creating a flow of air which tends to lift said piece of cloth, and said flutter tube station ejecting air upon said workpiece.

5. The ply shifter of claim 4 wherein said ply shifter station further includes at least one arm to support said roller, actuator means to drive said roller, lift means engaging said arm to raise said roller at a predetermined time after said roller has operated and before said feeder foot is to initiate its downstream delivery step, clamp means becoming operative in conjunction with said lift means after said roller has been raised, said clamp means engaging said stack for a predetermined time, means to deactivate said clamp means whereby said roller engages the next piece in said stack.

* * * * *